United States Patent Office 3,629,318
Patented Dec. 21, 1971

1

3,629,318
SYNTHESIS OF DIAMINOMALEONITRILE FROM HYDROGEN CYANIDE AS CATALYZED BY CYANOGEN OR DIIMINOSUCCINONITRILE
Owen Wright Webster, Wilmington, Del., assignor to E. I. du Pont de Nemours and Company, Wilmington, Del.
No Drawing. Continuation-in-part of application Ser. No. 707,459, Feb. 23, 1968, now Patent No. 3,564,039, which is a continuation-in-part of application Ser. No. 670,763, Sept. 26, 1967. This application Mar. 18, 1970, Ser. No. 20,821

Int. Cl. C07c 121/20
U.S. Cl. 260—465.5        10 Claims

ABSTRACT OF THE DISCLOSURE

Base-catalyzed tetramerization of hydrogen cyanide to diaminomaleonitrile achieved by catalyzing the same with a basic catalyst and a cocatalyst, cyanogen and/or diiminosuccinonitrile.

RELATED APPLICATIONS

This application is a continuation-in-part of my copending application Ser. No. 707,459, filed Feb. 23, 1968, now U.S. Pat. 3,564,039 as a continuation-in-part of my application Ser. No. 670,763, filed Sept. 26, 1967, and now abandoned.

BACKGROUND OF THE INVENTION

(1) Field of the Invention

The invention relates to, and has as its principal object provision of, a practical and novel process for the preparation of diaminomaleonitrile by the tetramerization of hydrogen cyanide as catalyzed by a basic catalyst and one or both of the cocatalysts cyanogen and diiminosuccinonitrile.

(2) Relationship to prior art

The base-catalyzed tetramerization of hydrogen cyanide to diaminomaleonitrile is shown by Woodward U.S. Pat. 2,499,441, with, however, low conversions.

Under conditions simulating postulated prebiotic conditions of the earth, R. A. Sanchez et al., J. Mol. Biol., 30, 223 (1967), describe the reaction of dilute aqueous solutions of ammonium cyanide. They disclose that cyanogen, cyanamide and diaminomaleonitrile increase the rate of polymerization of hydrogen cyanide. The conditions employed include the presence of large amounts of water and of ammonia, both of which are detrimental to the synthesis of diiminosuccinonitrile or diaminomaleonitrile because of extensive reactions of hydrolysis, ammonolysis, hydration and ammonia addition, loc. cit., p. 224 (chart). See also T. H. Brotherton and J. W. Lynn, Chem. Rev. 59, 851, 860, 878; J. Molec. Biol. 30, 225 (1967).

In my above-mentioned copending application Ser. No. 707,459, there are disclosed the novel compound diiminosuccinonitrile and its preparation from cyanogen and hydrogen cyanide in the presence of a basic catalyst. Also disclosed therein is the base-catalyzed preparation of diaminomaleonitrile from cyanogen or diiminosuccinonitrile and hydrogen cyanide at a temperature in the range 0–200° C.

SUMMARY AND DETAILS OF THE INVENTION

According to the present invention, diaminomaleonitrile is synthesized from hydrogen cyanide under the influence of a basic catalyst and at least one of the cocatalysts diiminosuccinonitrile or cyanogen. Illustrative and schematic equations for reactions occurring may be written as follows:

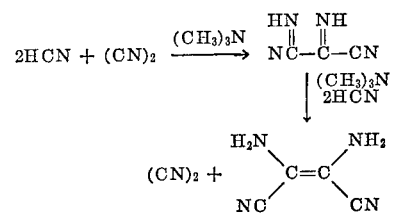

It may be noted that the reaction of Ser. No. 707,459 is not a catalytic reaction but a chemical reduction of diiminosuccinonitrile by hydrogen cyanide to yield diaminomaleonitrile. The present invention, on the other hand, provides a practical process in which cyanogen or diiminosuccinonitrile effects a several-fold conversion, on a molar basis, of hydrogen cyanide to its tetramer, diaminomaleonitrile. Thus, the relatively cheap hydrogen cyanide rather than expensive cyanogen can be employed as a precursor to diaminomaleonitrile.

The process of the invention is carried out by simply mixing the reactant cyanide, at least one of the cocatalysts and the basic catalyst and maintaining the mixture in liquid phase usually at a temperature of −40° to 25°, and preferably at −10° to 0°. Pressure is not a critical variable, ambient pressure being normally employed.

The requisite basic catalyst can be either soluble or insoluble. Such inorganic compounds as potassium and sodium cyanides as well as other alkaline cyanides are useful. Amines are also useful, trialkylamines being preferred as they are free of hydrogen that might react with hydrogen cyanide, cyanogen, diiminosuccinonitrile or diiminomaleonitrile. Also useful are pyridine, powdered soft glass, basic ion-exchange resins, sodium, potassium, and other metal hydroxides, calcium, barium and magnesium oxides, basic alumina, sodium carbonate, potassium carbonate, sodium bicarbonate, etc. The catalysts are those that have utility in the well-known cyanohydrin reaction. They are basic, i.e., exhibit a pH of over 7 in aqueous media. When ion-exchange resins are used in the latter test, the water should contain sodium chloride (or a similar salt). Soluble cyanides such as tetramethylammonium cyanide, tetraethylammonium cyanide or lithium cyanide are equivalent to the tertiary amine bases which react with hydrogen cyanide to produce cyanide ion and tertiary ammonium ion.

The concentration of the basic catalyst is not critical but the reactions are slow with trace amounts, and generally a mole ratio of base to hydrogen cyanide of 0.05 to 0.25 is used. The mole ratio of the cyanogen, or alternatively, diiminosuccinonitrile cocatalyst to hydrogen cyanide, is generally 0.025 to 0.25, preferably 0.025 to 0.075.

The order of addition of reactants is not critical but it is preferred to add the cyanogen or diiminosuccinonitrile cocatalyst last.

The reactions are carried out for periods of 2 to 24 hours, or longer depending on the temperature, and concentrations of the basic catalyst and the cocatalyst. At −40° C. the reaction requires 24–36 hours, even with the higher ranges of catalyst. At 25° C. the reaction proceeds about as fast as the reactants are combined, but side reactions also occur. At the preferred temperatures, reaction is generally complete in 3–6 hours.

The process can be carried out neat, i.e., without solvent, or in an organic liquid which is free of Zerewitinoff-active hydrogen and which is inert to cyanogen and hydrogen and which is inert to cyanogen and hydrogen cyanide. Since cyanogen boils at −21° C. and melts at −28° C., and hydrogen cyanide boils at 26° C. and melts at $-14°$ C., it is preferable to effect the reaction in a liquid phase, i.e., by use of selected solvents, pressures, or temperatures whereby the reactants are in a liquid phase. In addition, it is easier to control the reaction rate if a diluent is used. If a solvent or diluent is used, such inert liquids are suitable as acetonitrile, propionitrile, benzonitrile, tetrahydrofuran, dimethylformamide, dimethylacetamide, dimethoxyethane, ether, benzene, toluene, halogenated hydrocarbons such as chlorinated lower (1–2 carbons) aliphatics, Freons® and the like. Preferred are liquid lower $C_1$–$C_4$ alkylnitriles, N-di(lower alkyl)amides and chlorinated methane.

Halogenated lower alkanes, benzene, toluene and the Freons® are particularly preferred as diiminosuccinonitrile and diaminomaleonitrile are relatively insoluble and can be easily separated therefrom by filtration. This property is especially advantageous for a cyclic process in which the filtrate is recycled and the hydrogen cyanide replenished thereby providing a continuous process. In another method of continuous operation, the solvent, unreacted hydrogen cyanide and cyanogen are vacuum distilled away from the residue of diaminomaleonitrile, diimonosuccinonitrile and the black by-product that may be paracyanogen or higher polymers of hydrogen cyanide.

The reaction proceeds faster in solvents of low polarity as shown by comparison of Example 3 with any of Examples 1, 2, or 4–6. Preferred solvents are aprotic liquids that are nonpolar or have low polarity and include toluene, methylene chloride and mixtures of benzene with such solvents as toluene or methylcyclohexane that prevent freezing of the benzene.

Excess hydrogen cyanide can be used as solvent but with hazard as hydrogen cyanide containing cyanide ion has been known to explode [V. Migrdichian, "Organic Cyanogen Compounds," Reinhold Publishing Corporation, New York (1947), p. 349].

EMBODIMENTS OF THE INVENTION

There follow some nonlimiting examples which form specific embodiments of the invention. In these examples, and throughout the specification, temperatures are given in degrees centigrade. Reactions are carried out at ambient pressure.

On the basis of the equation:

$$4HCN \rightarrow DAMN \text{ (diaminomaleonitrile)}$$

conversion is given by:

$$\text{conversion} = \frac{\text{moles DAMN} \times 100}{1/4 \times \text{moles HCN}}$$

When cyanogen is used as a catalyst, it reacts with 2 moles of hydrogen cyanide to form diiminosuccinonitrile. The conversions should therefore be calculated by the formula:

Percent conversion =

$$\frac{\text{moles DAMN} \times 100}{\frac{1}{4} (\text{moles HCN} - 2 \times \text{moles (CN)}_2)}$$

The higher values for the conversions in Examples 2 and 6 were calculated by this formula.

The catalytic role of cyanogen or diiminosuccinonitrile may be emphasized here by viewing the "yield" as the number of moles of product produced per mole of "catalyst" expressed as percent. This number, expressed as the ratio of moles of product to moles of "catalyst," may be referred to as catalyst turnover. Both "yield" and "catalyst turnover" are given in the examples.

EXAMPLE 1

A 1-g. portion (0.0094 mole) of diiminosuccinonitrile was added to a solution of 10 ml. (0.259 mole) of hydrogen cyanide and 1 ml. of trimethylamine in 100 ml. of methylene chloride at $-10°$. The mixture was stirred for 6 hours at $-10°$ to $-5°$, and on filtration, 2.73 g., 270% yield, of diaminomaleonitrile was obtained. The product was identified by its infrared spectrum, having bands at 3400, 3300, 3200, 2200, 1640, 1610, 1310 and 1240 cm.$^{-1}$. Catalyst turnover was 2.7; conversion, 39%.

EXAMPLE 2

Gaseous cyanogen (21 g., 0.404 mole) was bubbled into a solution of 100 ml. (2.59 moles) of hydrogen cyanide and 14.5 ml. of trimethylamine in 300 ml. of ethylene chloride at $-10°$. This required about 2 hours. The mixture was stirred an additional 4 hours at $+10°$ to $0°$. The crude product, amounting to 80.8 g., was collected on a filter and purified by extraction with 800 ml. of tetrahydrofuran. Dilution of this solution with 4 liters of heptane yielded 47.3 g. (108% yield, based on cyanogen) of purified diaminomaleonitrile. Catalyst turnover: 1.08; conversion: 68% (100%).

EXAMPLE 3

A 1-g. portion (0.0094 mole) of diiminosuccinonitrile was added to a solution of 5 ml. (0.128 mole) of hydrogen cyanide dissolved in 20 ml. of trimethylamine at $-40°$. The solution was stirred at $-10°$ for 4 hours and the volatile material removed under reduced pressure. The residue was extracted with ether and the ether solution evaporated to yield 0.8 g. (79% yield, based on diiminosuccinonitrile) of diaminomaleonitrile. Catalyst turnover: 0.79; conversion: 23%.

EXAMPLE 4

A solution of 1 g. (0.0094 mole) of diiminosuccinonitrile in 5 ml. of tetrahydrofuran was added, over a 2-hour period, to a solution of 7 ml. (0.178 mole) of hydrogen cyanide and 1 ml. of triethylamine in 40 ml. of methylene chloride at $0°$. The mixture was stirred for an additional 3 hours at $0°$ to $5°$. When worked up as in Example 2, 1.28 g. (126% yield, based on diiminosuccinonitrile) of diaminomaleonitrile was collected on a filter. Catalyst turnover: 1.3; conversion: 27%.

EXAMPLE 5

A solution of 1 g. (0.0094 mole) of diiminosuccinonitrile in 5 ml. of tetrahydrofuran was added to a solution of 12 ml. (0.306 mole) of hydrogen cyanide and 1 ml. of triethylamine in 40 ml. of toluene at $0°$. The addition required 2 hours, following which the mixture was stirred for 3 hours at $0°$ to $5°$. The reaction mixture was filtered to yield 4.38 g. of crude diaminomaleonitrile. Purification by dissolution in tetrahydrofuran and precipitation with heptane yielded 2.98 g. (294% yield, based on diiminosuccinonitrile) of pure diaminomaleonitrile. Catalyst turnover: 2.94; conversion: 36.0%.

EXAMPLE 6

A reactor was charged with 300 ml. of toluene, 100 ml. (70 g., 2.59 moles) of hydrogen cyanide, and 11 ml. of trimethylamine. The solution was stirred at $-10°$ C. while adding 9.3 g. (0.179 mole) of gaseous cyanogen over the solution at a rate of about 1.5 g./hour; the crude product collected by filtration amounted to 67 g. This was extracted with 2 liters of tetrahydrofuran to leave 13 g. of insoluble polymeric material. Concentration of the tetrahydrofuran solution to 200 ml. and dilution with 3 liters of hexane yielded 50 g. of diaminomaleonitrile, 259% yield, based on cyanogen. Catalyst turnover: 2.59; conversion 71.4% (83.0%).

Since obvious modifications and equivalents will be evident to those skilled in the chemical arts, I propose to be bound solely by the appended claims.

The embodiments of the invention in which an exclusive property or privilege is claimed are defined as follows:

1. The process of preparing diaminomaleonitrile which comprises tetramerizing, in liquid phase,
   hydrogen cyanide at a temperature in the range of about −40° C. to 25° C.,
in the presence of
a catalytic amount of a basic catalyst and
at least one cocatalyst of the group consisting of cyanogen and diiminosuccinonitrile, the mole ratio of cocatalyst to hydrogen cyanide being in the range of about 0.025 to 0.25.

2. The process of claim 1 wherein the temperature is in the range of about −10° C. to 0° C.

3. The process of claim 1 wherein the mole ratio of cocatalyst to hydrogen cyanide is in the range of about 0.025 to 0.075.

4. The process of claim 1 carried out in an aprotic solvent.

5. The process of claim 1 in which the basic catalyst is an amine.

6. The process of claim 5 in which the basic catalyst is a trialkylamine.

7. The process of claim 1 in which hydrogen cyanide is tetramerized in methylene chloride in the presence of trimethylamine and diiminosuccinonitrile.

8. The process of claim 1 in which hydrogen cyanide is tetramerized in methylene chloride in the presence of trimethylamine and cyanogen.

9. The process of claim 1 in which hydrogen cyanide is tetramerized in trimethylamine in the presence of diiminosuccinonitrile.

10. The process of claim 1 in which hydrogen cyanide is tetramerized in toluene in the presence of trimethylamine and cyanogen.

References Cited

UNITED STATES PATENTS

| | | | |
|---|---|---|---|
| 2,499,441 | 3/1950 | Woodward | 260—465.5 |
| 3,564,039 | 2/1971 | Webster | 260—465.5 |

JOSEPH PAUL BRUST, Primary Examiner